(12) United States Patent
Kim et al.

(10) Patent No.: US 12,445,744 B2
(45) Date of Patent: Oct. 14, 2025

(54) VISION SENSOR AND IMAGE PROCESSING DEVICE INCLUDING THE SAME

(71) Applicant: Samsung Electronics Co., Ltd., Suwon-si (KR)

(72) Inventors: Junseok Kim, Suwon-si (KR); Keunjoo Park, Suwon-si (KR); Bongki Son, Suwon-si (KR); Inchun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/406,679

(22) Filed: Jan. 8, 2024

(65) Prior Publication Data

US 2024/0236517 A1 Jul. 11, 2024

(30) Foreign Application Priority Data

Jan. 9, 2023 (KR) .................. 10-2023-0003030

(51) Int. Cl.
*H04N 25/47* (2023.01)
*H04N 25/707* (2023.01)
*H04N 25/79* (2023.01)

(52) U.S. Cl.
CPC .......... *H04N 25/47* (2023.01); *H04N 25/707* (2023.01); *H04N 25/79* (2023.01)

(58) Field of Classification Search
CPC ............................ H04N 25/47; H04N 25/707
See application file for complete search history.

(56) References Cited

U.S. PATENT DOCUMENTS

| | | | |
|---|---|---|---|
| 10,161,789 B2 | 12/2018 | Suh et al. |
| 10,728,450 B2 | 7/2020 | Govil et al. |
| 10,855,927 B2 | 12/2020 | Jung et al. |
| 11,195,869 B2 | 12/2021 | Mi et al. |
| 11,240,449 B2 | 2/2022 | Mostafalu et al. |
| 11,240,454 B2 | 2/2022 | Gao et al. |
| 11,330,219 B2 | 5/2022 | Kim et al. |
| 11,368,645 B2 | 6/2022 | Finateu et al. |
| 11,375,149 B2 | 6/2022 | Niwa |

(Continued)

FOREIGN PATENT DOCUMENTS

EP 3 582 491 A1 12/2019

OTHER PUBLICATIONS

Rebecq, et al., "High Speed and High Dynamic Range Video with an Event Camera", IEEE Transactions on Pattern Analysis and Machine Intelligence, 2019, (26 pages).

(Continued)

*Primary Examiner* — Thanh Luu
(74) *Attorney, Agent, or Firm* — Wolf, Greenfield & Sacks, P.C.

(57) ABSTRACT

Provided are a vision sensor and an image processing device including the vision sensor. The vision sensor includes a pixel array including a plurality of pixels each including a photoelectric conversion device, which is configured to generate an optical current, a read-out circuit configured to generate intensity image data based on a magnitude of a voltage converted from the optical current, and a data output logic configured to generate event data based on a variation amount in the voltage converted from the optical current.

19 Claims, 13 Drawing Sheets

(56) References Cited

U.S. PATENT DOCUMENTS

| | | | |
|---|---|---|---|
| 2008/0135731 A1* | 6/2008 | Lichtsteiner | H04N 25/40 348/E3.018 |
| 2014/0326854 A1* | 11/2014 | Delbruck | H04N 25/707 250/204 |
| 2016/0093273 A1 | 3/2016 | Wang et al. | |
| 2021/0152757 A1 | 5/2021 | Wakabayashi | |
| 2021/0344854 A1 | 11/2021 | Bock et al. | |
| 2021/0377453 A1 | 12/2021 | Nistico | |
| 2021/0377465 A1 | 12/2021 | Mandelli et al. | |
| 2021/0377512 A1 | 12/2021 | Nistico | |

OTHER PUBLICATIONS

Extended European Search Report corresponding to EP 24150252. 5, May 8, 2024, (12 pages).

Huang, et al., "A Dynamic Vision Sensor with Direct Logarithmic Output and Full-Frame Picture-On-Demand", IEEE International Symposium on Circuits and Systems (ISCAS), Baltimore, MD, USA, 2017, 1-4.

Moeys, et al., "A Sensitive Dynamic and Active Pixel Vision Sensor for Color or Neural Imaging Applications", IEEE Transactions on Biomedical Circuits and Systems, 12(1), 2018, 123-136.

* cited by examiner

VISION SENSOR AND IMAGE PROCESSING DEVICE INCLUDING THE SAME

CROSS-REFERENCE TO RELATED APPLICATION

This application is based on and claims priority under 35 U.S.C. § 119 to Korean Patent Application No. 10-2023-0003030, filed on Jan. 9, 2023, in the Korean Intellectual Property Office, the disclosure of which is incorporated by reference herein in its entirety.

BACKGROUND

The inventive concept relates to a vision sensor and an image processing device including the same, and more particularly, to a vision sensor capable of generating event data and intensity image data and an image processing device including the vision sensor.

Human-computer interaction (HCI) is expressed on and operated in a user interface. Various user interfaces recognizing user inputs may provide natural interactions between humans and computers. Various sensors may be used to recognize user inputs.

A vision sensor, e.g., an active vision sensor generates, when an event (e.g., change in light intensity) occurs, information about the event, that is, event data, and transfers the event data to a processor.

SUMMARY

The inventive concept provides a vision sensor capable of generating event data and intensity image data, and an image processing device including the vision sensor.

According to an aspect of the inventive concept, there is provided a vision sensor including a pixel array including a plurality of pixels each including a photoelectric conversion device, which is configured to generate an optical current, a read-out circuit configured to generate intensity image data based on a magnitude of a voltage converted from the optical current, and a data output logic configured to generate event data based on a variation amount in the voltage converted from the optical current.

According to another aspect of the inventive concept, there is provided a vision sensor including a plurality of pixels, wherein each of the plurality of pixels includes a current-voltage converter circuit including a photoelectric conversion device and converting the optical current generated by the photoelectric conversion device into a log voltage, a source-follower buffer configured to generate a source-follower voltage based on the log voltage, an amplifier circuit configured to generate an amplification voltage by amplifying the source-follower voltage, and a first output circuit configured to output a first output voltage based on the log voltage to an external destination outside of the plurality of pixels.

According to another aspect of the inventive concept, there is provided an image processing device including a vision sensor configured to generate event data and intensity image data, and a processor configured to perform image processing on the event data and the intensity image data, wherein the event data represents a variation amount in a voltage converted from an optical current that is generated by the photoelectric conversion device included in the vision sensor, and wherein the intensity image data represents a magnitude of the voltage converted from the optical current generated by the photoelectric conversion device.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1A:
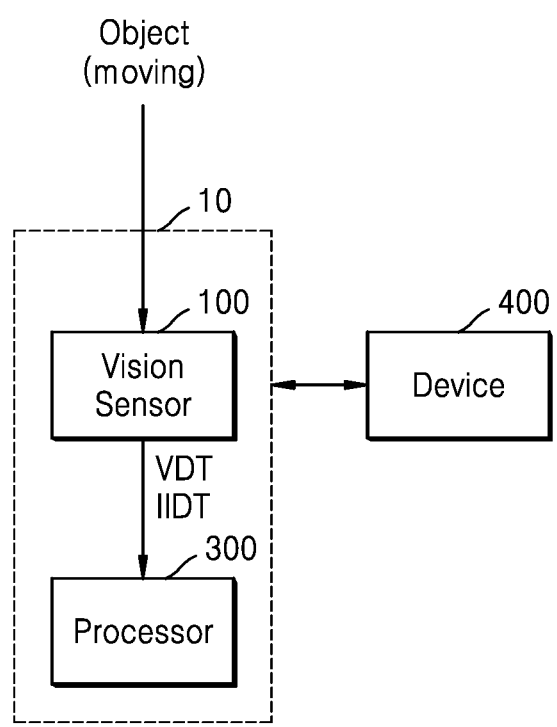
FIGS. 1A and 1B are block diagrams of an image processing device according to an embodiment.

Hereinafter, some embodiments will be described in detail with reference to accompanying drawings. Like reference numerals denote the same elements in the drawings, and detailed descriptions thereof are omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

Figure 1B:
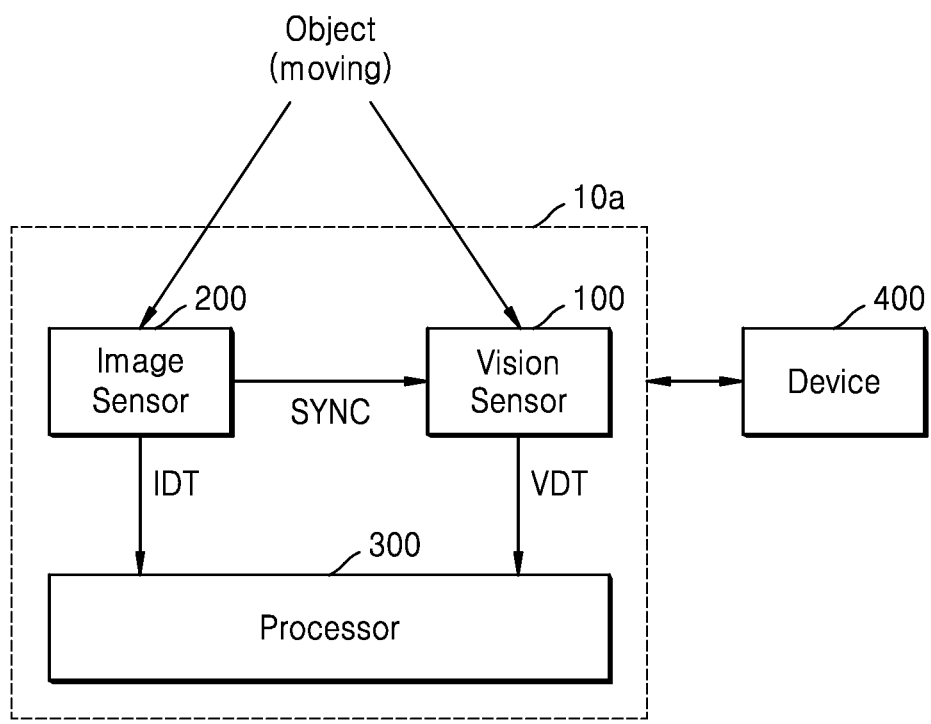

FIGS. 1A and 1B are block diagrams of an image processing device according to an embodiment.

Referring to FIG. 1A, an image processing device 10 includes a vision sensor 100 and a processor 300. The image processing device 10 according to an embodiment may be loaded in an electronic device having an image or light sensing function. For example, the image processing device 10 may be loaded in an electronic device, such as a camera, s smartphone, a wearable device, an Internet of Things (IOT) device, a tablet personal computer (PC), a personal digital assistant (PDA), a portable multimedia player (PMP), a navigation device, a drone, an advanced driver's assistance system (ADAS), etc. Also, the image processing device 10 may be provided as a component of another apparatus, such as a vehicle, furniture, manufacturing equipment, doors, various measuring devices, etc.

The vision sensor 100 may be configured to sense a change in an intensity of incident light and may be configured to output event data VDT accordingly. The vision sensor 100 may be an active vision sensor configured to output the event data VDT including information about pixels from which the change in the light intensity is sensed, that is, pixels where an event (on-event or off-event) occurs. For example, the vision sensor 100 may include a plurality of pixel arrays (e.g., 110 of FIG. 2) each including a photoelectric conversion device, and a data output logic (e.g., 140 of FIG. 2) configured to generate event data according to or based on a variation amount of a voltage converted from an optical current generated by the photoelectric conversion device (e.g., photodiode). That is, the change in the voltage level is used to generate event data VDT that is representative of an event captured by the vision sensor 100. The event data VDT may include event information about a kind of the event (on-event or off-event) occurring in the pixels, and address information about a position of the pixel in which the event occurs.

The change in the light intensity may be caused by the movement of an object photographed by the vision sensor 100, or movement of the vision sensor 100 or the image processing device 10 itself. The vision sensor 100 may be configured to transfer event data VDT (e.g., vision sensor data) including event signals to the processor 300 regularly or irregularly.

Also, the vision sensor 100 may be configured to output intensity image data IIDT according to the intensity of the incident light. The intensity image data IIDT may include a grayscale image. For example, the vision sensor 100 may include a read-out circuit that is configured to generate the intensity image data IIDT according to or based on a magnitude of a log voltage (e.g., VLOG of FIG. 5) that is obtained by amplifying an optical current generated by the photoelectric conversion device included in the pixels to a log-scale.

Therefore, the vision sensor 100 may be configured to generate both the event data VDT including event information indicating whether the event occurs, and the intensity image data IIDT including intensity information about the intensity of the light. The vision sensor 100 may be configured to provide the processor 300 with the event data VDT and the intensity image data IIDT. For example, the vision sensor 100 may be configured to transfer the intensity image data IIDT to the processor 300 regardless of the occurrence of an event or, for example, the vision sensor 100 may be configured to transfer the intensity image data IIDT to the processor 300 along with the event data VDT when sensing the occurrence of an event.

The processor 300 may be configured to receive the event data VDT and the intensity image data IIDT from the vision sensor 100 and may be configured to carry out an image processing operation on the event data VDT and the intensity image data IIDT. The intensity image data IIDT generated by the vision sensor 100 is generated from the log voltage VLOG that is generated by a current-voltage conversion circuit (for example, current-voltage converter circuit 111 of FIG. 5) of the vision sensor 100, and thus, the processor 300 may be configured to implement or generate the intensity image data IIDT of high dynamic range (HDR) by carrying out or performing the image processing operation by using the intensity image data IIDT.

The processor 300 may include an application specific integrated circuit (ASIC), a field-programmable gate array (FPGA), a dedicated microprocessor, a microprocessor, and/or a general-purpose processor, etc. In an embodiment, the processor 300 may include an application processor and/or an image signal processor.

In an embodiment, the vision sensor 100 and the processor 300 may be each implemented as an integrated circuit (IC). For example, the vision sensor 100 and the processor 300 may be implemented as separate semiconductor chips.

In other embodiments, the vision sensor 100 and the processor 300 may be implemented as a single chip. For example, the vision sensor 100 and the processor 300 may be implemented as a system on chip (SoC).

Referring to FIG. 1B, an image processing device 10a may include the vision sensor 100, an image processing device 200, and the processor 300. The vision sensor 100 of FIG. 1B may be similar to the vision sensor 100 described with reference to FIG. 1A.

The vision sensor 100 may be configured to generate a time stamp capable of matching an image frame generated by the image sensor 200 and an event sensed by the vision sensor 100 based on a synchronization signal SYNC received from the image sensor 200. The event data VDT may include the time stamp and may be transferred to the processor 300. For example, the time stamp may include information about a time point when the image sensor 200 is exposed, a time point when the image frame is generated, and/or a time point when the event is sensed.

The vision sensor 100 may be configured to output a device synchronization signal for synchronizing external devices including the image sensor 200 with the vision sensor 100 by using the synchronization signal SYNC received from the image sensor 200 or an internal signal of the vision sensor 100. The vision sensor 100 may be configured to output a plurality of device synchronization signals and may be configured to independently control the device synchronization signals.

The image sensor 200 may be configured to convert an optical signal of an object incident through an optical lens into an electrical signal and may be configured to generate and output the image data IDT based on the electrical signals. The image sensor 200 may include, for example, a pixel array including a plurality of pixels arranged two-dimensionally, a read-out circuit, a signal processor, etc., and the pixel array of the image sensor 200 may be configured to convert the received optical signals into electrical signals. The pixel array of the image sensor 200 may include a plurality of pixels implemented as photoelectric conversion devices, such as a charge coupled device (CCD) or a complementary metal oxide semiconductor (CMOS), and the pixels may be implemented as various kinds of photoelectric conversion devices other than the above examples.

The read-out signal of the image sensor 200 may be configured to generate raw data based on the electrical signal provided from the pixel array, and the signal processor of the image sensor 200 may be configured to carry out or perform an image process (e.g., processing operations, such as bad-pixel removal, etc.) on the raw data and output the image data IDT. The image sensor 200 may be implemented as a semiconductor chip or a package including the pixel array, the read-out circuit, and the signal processor.

The image sensor 200 may generate the synchronization signal SYNC for communication to the vision sensor 100 to synchronize the vision sensor 100 with the image sensor 200. The synchronization signal SYNC may be generated based on shutter signal information, read-out signal information, image frame information, etc. of the image sensor 200.

The processor 300 may carry out or perform the image processing on the image data IDT provided from the image sensor 200. For example, the processor 300 may perform image processing including, but not limited to, an image process of changing data type (e.g., changing image data of Bayer pattern into YUV or RGB type), noise reduction, brightness adjustment, sharpness adjustment, etc. on the image data IDT. The processor 300 may be configured to process the vision sensor data VDT received from the vision sensor 100 and may be configured to detect the movement of an object (or the movement of the object on an image sensed by the image processing device 10) based on an event data VDT (e.g., the vision sensor data). The processor 300 may be configured to carry out or perform the image process on the image data IDT by using the event data VDT and the intensity image data IIDT. The processor 300 may match the image frame included in the image data IDT provided from the image sensor 200 and the event data VDT received from the vision sensor 100 by using the time stamp and the synchronization signal information.

A blur may occur in the image sensor IDT due to the movement of the object photographed by the image sensor 10 or the movement of the image sensor 200 or the image processing device 10 itself. The processor 300 may be configured to perform an image deblurring process on the image data IDT by using the event data VDT and the intensity image data IIDT. The image deblurring process may be an image process for generating a sharp image by removing the blur from the image data IDT. The vision sensor 100 may be configured to operate relatively fast as compared with the image sensor 200, and thus, the image processing device 10 according to embodiments of the inventive concept may perform an efficient image deblurring process by using both the event data VDT and the intensity image data IIDT generated by the vision sensor 100.

Also, the processor 300 may be configured to secure image data of HDR by carrying out or performing the image process on the image data IDT by using the intensity image data IIDT. In particular, the intensity image data IIDT is generated according to the log voltage VLOG that is obtained by amplifying the optical current generated by the photodiode of the vision sensor 100 into a log scale, and thus, the data of HDR may be secured. Therefore, the processor 300 may be configured to carry out or perform the image process on the image data IDT by using the intensity image data IIDT, and the image processing device 10 that may secure or provide HDR may be implemented.

In an embodiment, the vision sensor 100, the image sensor 200, and the processor 300 may be each implemented as an integrated circuit (IC). For example, the vision sensor 100, the image sensor 200, and the processor 300 may be implemented as separate semiconductor chips. In other embodiments, the vision sensor 100, the image sensor 200, and the processor 300 may be implemented as a single chip. For example, the vision sensor 100, the image sensor 200, and the processor 300 may be implemented as a system on chip (SoC).

The image processing device 10a may be configured to control an external device 400 and collect data. The image processing device 10a may be configured to match the time stamp and the data collected from the device 400. The device 400 may include, but is not limited to, an acceleration sensor, an inertial measurement unit (IMU), a gyro sensor, an infrared-ray (IR) LED, a flashlight, etc.

Figure 2:
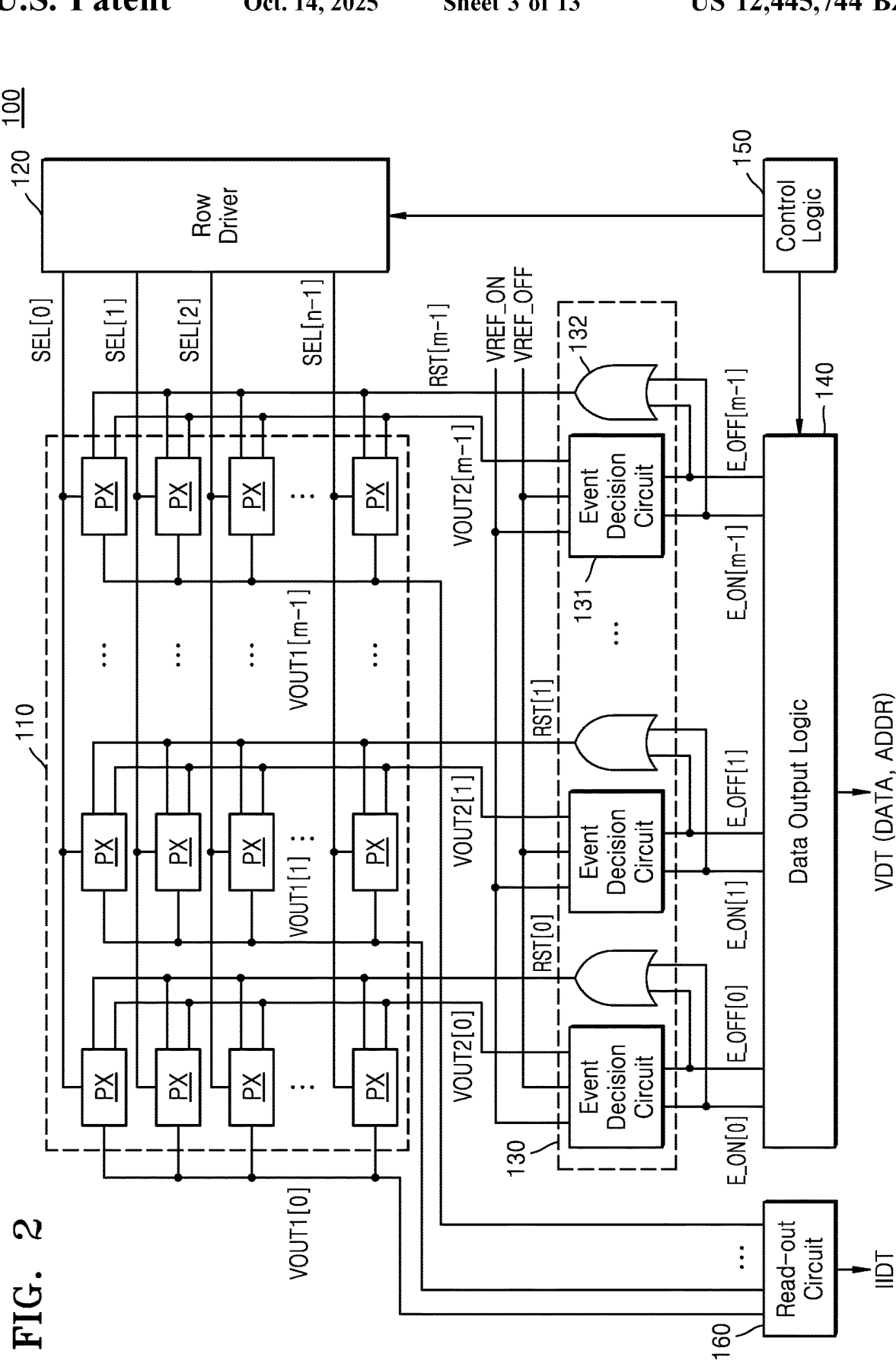
FIG. 2 is a block diagram of a vision sensor according to an embodiment.
Figure 3:
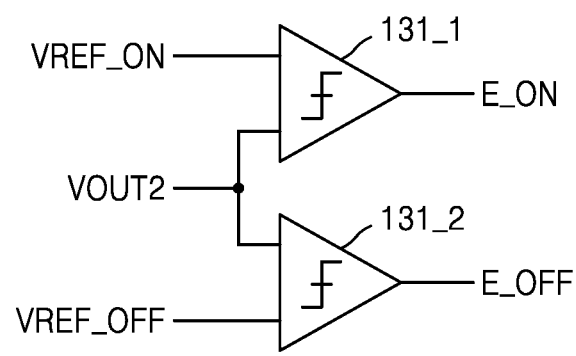
FIG. 3 is a block diagram of an event decision circuit included in the vision sensor according to an embodiment.
Figure 4:
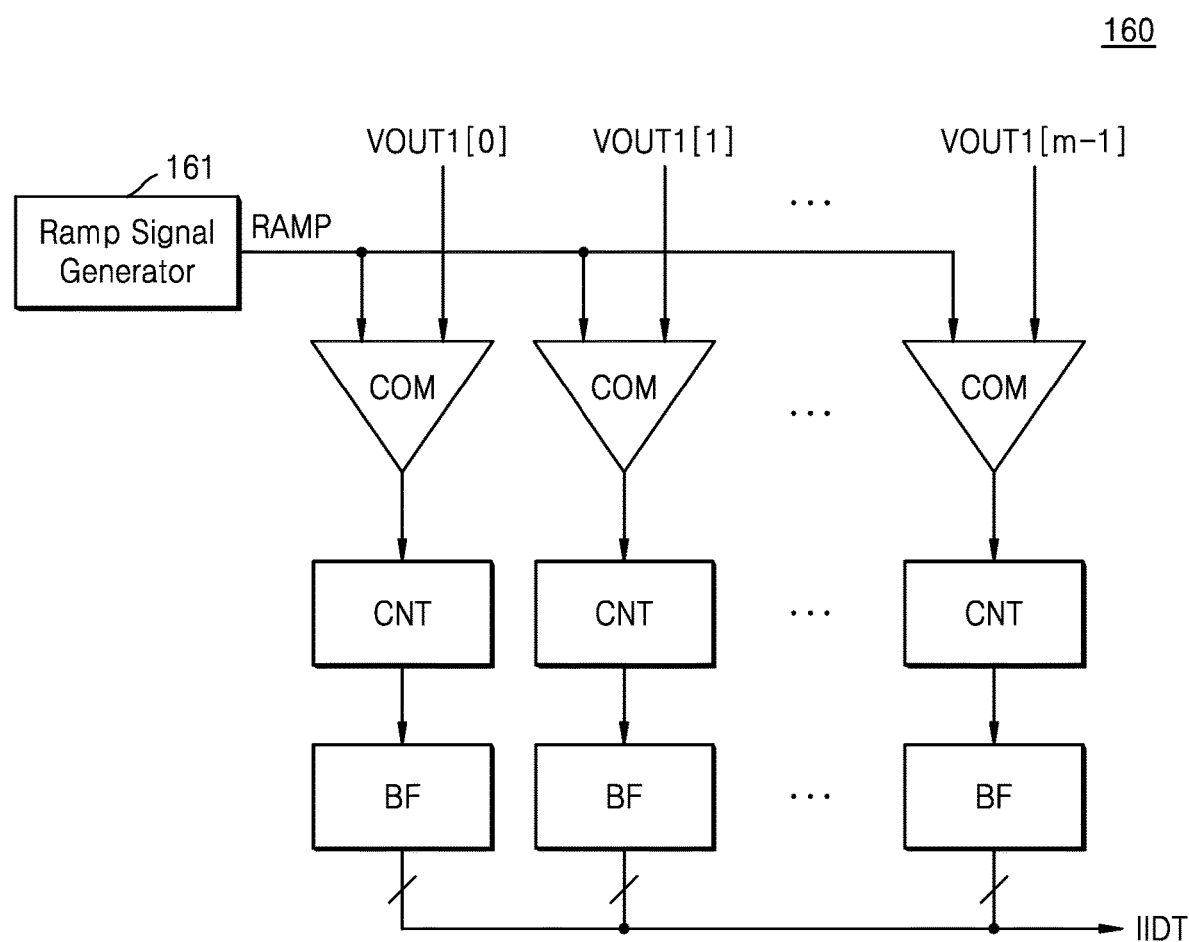
FIG. 4 is a block diagram of a read-out circuit included in the vision sensor according to an embodiment.

FIG. 2 is a block diagram of the vision sensor 100 according to an embodiment. FIG. 3 is a block diagram of an event decision circuit 131 included in the vision sensor 100 according to an embodiment. FIG. 4 is a block diagram of a read-out circuit 160 included in the vision sensor 100 according to an embodiment. The vision sensor 100 of FIG. 2 is an example of the vision sensor 100 of FIG. 1A or FIG. 1B.

Referring to FIG. 2, the vision sensor 100 may include the pixel array 110, a row driver 120, an event detection circuit 130, a data output logic 140, a control logic 150, and a read-out circuit 160. The vision sensor 100 may further include a voltage generator that is configured to generate an on-reference voltage VREF_ON and an off-reference voltage VREF_OFF.

The pixel array 110 may include a plurality of pixels PX arranged in a matrix form (e.g., matrix of n rows and m columns, n and m are natural numbers). Each of the plurality of pixels PX may be configured to sense events in which an intensity of incident light increases or decreases. Each of the plurality of pixels PX may be configured to output a first output voltage (one of VOUT1[0] to VOUT1[m−1]) via a first column line in response to a corresponding selection signal (one of SEL[0] to SEL[n−1]) received via a row line, and configured to output a second output voltage (one of VOUT2([0] to VOUT2[m−1]) via a second column line in response to a corresponding selection signal (one of SEL[0] to SEL[n−1]) received through the row line.

The first output voltage (one of VOUT1[0] to VOUT1[m−1]) output from each of the plurality of pixels PX may have a value corresponding to the light intensity. That is, the first output voltage (one of VOUT1[0] to VOUT1[m−1]) may have a value corresponding to a magnitude converted from the optical current generated by the photoelectric conversion device of the pixel PX (e.g., the log voltage VLOG of FIG. 5). Also, the second output voltage (one of VOUT2[0] to VOUT2[m−1]) output from each of the plurality of pixels PX may have a value corresponding to a variation amount in the light intensity. That is, the second output voltage (one of VOUT2[0] to VOUT2[m−1]) may have a value corresponding to a variation amount in the voltage converted from the optical current generated by the photoelectric conversion device of the pixel PX (e.g., the log voltage VLOG).

The pixel array 110 may be configured to receive reset signals RST[0] to RST[m−1] via third column lines. The pixel PX may be reset according to the reset signal (one of RST[0] to RST[m−1]), and the second output voltage (one of VOUT2[0] to VOUT2[m−1]) output from the pixels PX. From a point in time when the second output voltages VOUT2[0] to VOUT2[m−1] are reset, the pixel array 110 and the event detection circuit 130 may be configured to detect the variation amount in the light intensity again.

The row driver 120 may be configured to transmit the selection signals SEL[0] to SEL[n−1] to the pixel array 120 according to one or more control signals from the control logic 150. The row driver 120 is configured to transmit the selection signals SEL[0] to SEL[n−1] corresponding respectively to n row lines, and thus, may select the pixel array 110 in row units. The selection signals SEL[0] to SEL[n−1] may each have an active level (e.g., logic high) representing selection of the row line, and an inactive level (e.g., logic low) representing non-selecting of the row line. The row driver 120 may be configured to select the pixel array 110 in the row units by sequentially transitioning the selection signals SEL[0] to SEL[n−1] to the active levels. However, embodiments of the inventive concept are not limited thereto, and the row driver 120 may be implemented to transition the selection signals SEL[0] to SEL[n−1] to the active level in a set order or random order.

The event detection circuit 130 may be configured to detect and process events from the pixel array 110. The event detection circuit 130 may be configured to generate event information about the kind of the event occurring in the pixel PX (that is, event polarity indicating whether the event is on-event or off-event), and address information that is information about the position of the pixel in which the event occurs. For example, the event detection circuit 130 may include a plurality of event decision circuits 131. Each of the plurality of event decision circuits 131 may be connected to a corresponding second column line and may receive a corresponding second output voltage (one of VOUT2[0] to VOUT2[m−1]), and may be configured to generate an on-signal (one of E_ON[0] to E_ON[m−1]) or an off-signal (one of E_OFF[0] to E_OFF[m−1]) according to a result of comparing the second output voltage (one of VOUT2[0] to VOUT2[m−1]) with an on-reference voltage VREF_ON and an off-reference voltage VREF_OFF.

The event detection circuit 130 may be configured to generate reset signals RST[0] to RST[m−1] when detecting an on-even or off-event. That is, the event detection circuit 130 may be configured to provide a certain pixel PX, in which the on-event or off-event occurs, with a reset signal (one of RST[0] to RST[m−1]) via a corresponding third column line.

For example, the event detection circuit 130 may include a plurality of reset circuits 132, and each of the reset circuits 132 may include, for example, an OR gate. The reset circuit 132 may be configured to generate the reset signal (one of RST[0] to RST[m−1]) of a logic high level when receiving an activated (e.g., logic high) on-signal (one of E_ON[0] to E_ON[m−1]) or an activated (e.g., logic high) off-signal (one of E_OFF[0] to E_OFF[m−1]).

As shown in FIG. 2, the reset signals RST[0] to RST[m−1] may be signals for individually resetting the pixels PX, but embodiments of the inventive concept are not limited thereto. The event detection circuit 130 may be configured to provide the pixels PX with a global reset signal for simultaneously or in coordinated fashion resetting at least some of the pixels PX included in the pixel array 110.

Referring to FIG. 2 and FIG. 3, the event decision circuits 131 may each include a first comparison circuit 131_1 and a second comparison circuit 131_2. The first comparison circuit 131_1 may be configured to compare the second output voltage VOUT2 (e.g., one of VOUT2[0] to VOUT2 [m−1]) with the on-reference voltage VREF_ON, and may be configured to generate the on-signal E_ON (e.g., one of E_ON[0] to E_ON[m−1]) according to or based on the comparison result. The second comparison circuit 131_2 may be configured to compare the second output voltage VOUT2 with the off-reference voltage VREF_OFF and may be configured to generate the off-signal E_OFF (e.g., one of E_OFF[0] to E_OFF[m−1]) according to or based on the comparison result. The first comparison circuit 131_1 and the second comparison circuit 131_2 may be configured to generate the on-signal E_ON or the off-signal E_OFF based on the variation amount in the second output voltage VOUT2 according to the change in the light received by the photoelectric conversion device included in the pixel PX. For example, the on-signal E_ON may be in a logic high level when the intensity of light received by the photoelectric conversion device of the pixel PX is increased by a certain threshold amount or greater, and the off-signal E_OFF may be in a logic high level when the intensity of the light received by the photoelectric conversion device of the pixel PX is decreased by a certain threshold amount or greater.

Referring back to FIG. 2, the data output logic 140 is configured to receive the on-signals E_ON[0] to E_ON[m−1] and off-signals E_OFF[0] to E_OFF[m−1], and may be configured to generate event data VDT including event information DATA representing the kind of occurred event (polarity) and address information ADDR of the pixel PX in which the event occurs, according to or based on the on-signals E_ON[0] to E_ON[m−1] and the off-signals E_OFF[0] to E_OFF[m−1].

The data output logic 140 may be configured to remove the noise event and to generate the event data VDT about effective events. Also, the data output logic 140 may be configured to generate the event data VDT including information about the time when the event occurs.

The data output logic 140 may be configured to process the events occurring in the pixel array 110 in the pixel PX units, in sub-pixel array units including a plurality of pixels PX, in column units, and/or in frame units. The data output logic 140 may be configured to transmit the event data VDT to the processor (e.g., 300 of FIG. 1A or 1B) according to or based on a set protocol.

The control logic 150 may be configured to control overall operations of the vision sensor 100. For example, the control logic 150 may control operations of the row driver 120, the data output logic 140, the read-out circuit 160, etc. according to or based on control signals provided from the processor 300.

The read-out circuit 160 may be configured to receive the first output voltages VOUT1[0] to VOUT1[m−1] and output the intensity image data IIDT. Each of the first output voltages VOUT1[0] to VOUT1[m−1] may correspond to a magnitude of a log voltage that is amplified from the optical current generated by the photoelectric conversion devices included in the corresponding pixel PX to a log scale. The read-out circuit 160 may be configured to generate the intensity image data IIDT by performing analog-to-digital conversion of the first output voltages VOUT1[0] to VOUT1 [m−1].

Referring to FIGS. 2 and 4, the read-out circuit 160 may include a plurality of comparators COM, a plurality of counter circuits CNT, a plurality of buffer circuits BF, and a ramp signal generator 161. The ramp signal generator 161 may be configured to generate a ramp signal RAMP of a ramp voltage that increases or decreases with a certain inclination.

The plurality of comparators COM may be configured to receive the first output voltages VOUT1[0] to VOUT1[m−1] from the pixel array 110 and may be configured to output a comparison result signal by comparing each of the first output voltages VOUT1[0] to VOUT1[m−1] with the ramp signal RAMP. Each of the plurality of comparators COM may be configured to receive the first output voltage corresponding thereto (one of VOUT1[0] to VOUT1[m−1]) via the corresponding first column line.

The plurality of counter circuits CNT may be configured to convert an analog signal corresponding to a level of the comparison result signal received from the plurality of comparators COM into a digital signal. The plurality of counter circuits CNT is configured to count time points of level transitions of the comparison result signals output from the plurality of comparators COM, and to output the count values. In an embodiment, the counter circuit CNT may include a latch circuit and a calculation circuit.

The plurality of buffers BF may be configured to latch the digital signals and latched digital signals may be output to the outside of the vision sensor 100 (e.g., the processor 300 of FIG. 1A or 1B) as the intensity image data IIDT. In an embodiment, the read-out circuit 160 may be configured to output the intensity image data IIDT to the processor 300 regardless of the event data VDT, or when the event data VDT is output from the data output logic 140, the read-out circuit 160 may be configured to output the image data IDT to the processor 300.

Figure 5:
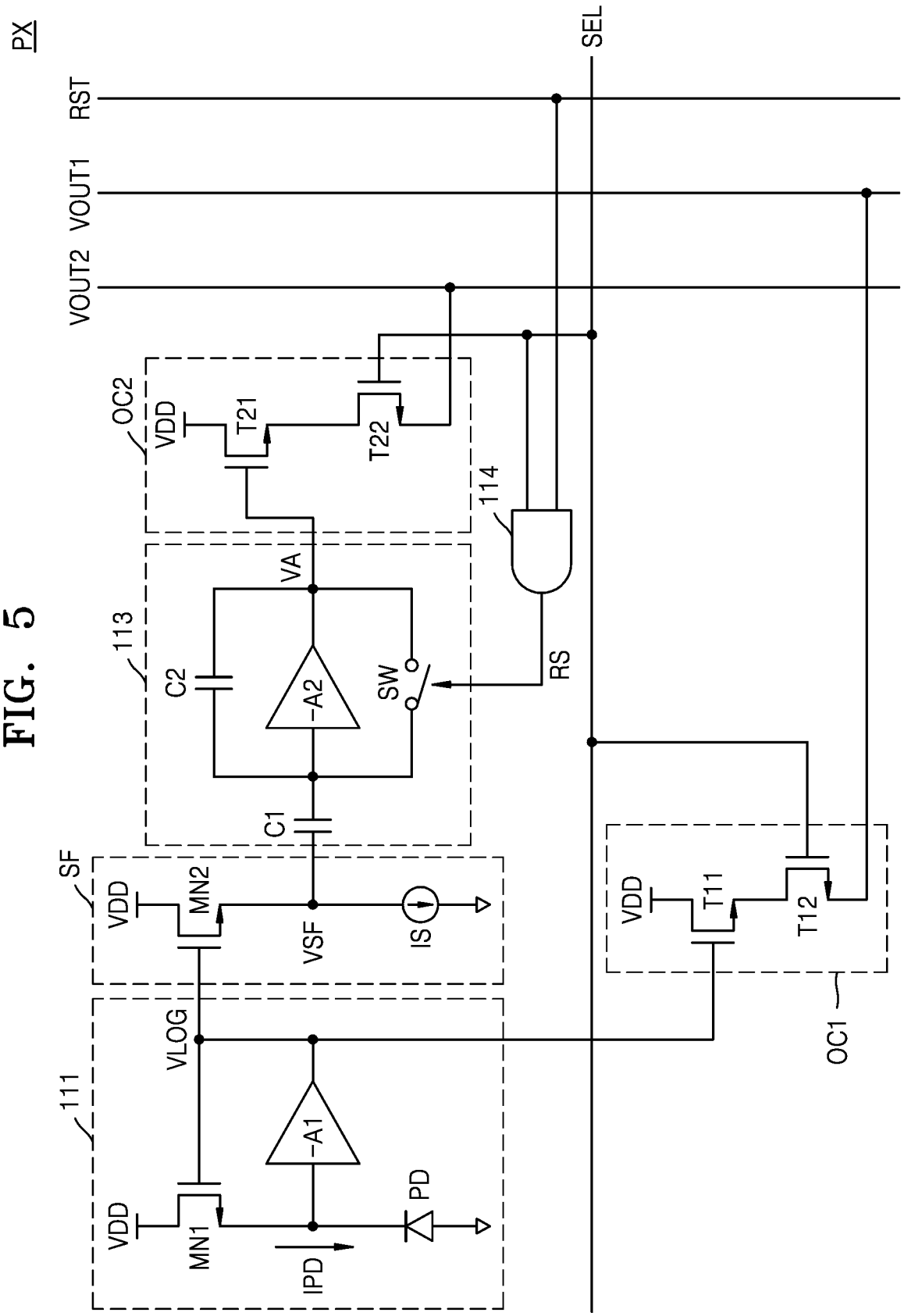
FIG. 5 is a circuit diagram of a pixel included in a pixel array according to an embodiment.

FIG. 5 is a circuit diagram of the pixel PX included in the pixel array 110 according to an embodiment. The pixel PX may be an example of the pixel PX shown in FIG. 2.

Referring to FIG. 5, the pixel PX may include a current-voltage converter circuit 111 including the photoelectric conversion device, an amplifier circuit 113, a first output circuit OC1, and a second output circuit OC2. Also, the pixel PX may include a reset switching circuit 114 that is configured to receive the reset signal RST and to generate a reset switching signal RS.

The photoelectric conversion device PD included in the current-voltage converter circuit 111 may be configured to convert the incident light, that is, the optical signal, into an optical current IPD that is an electrical signal. For example, the photoelectric conversion device PD may include a photodiode, a phototransistor, a photo gate, or a pinned photodiode. The photoelectric conversion device PD may be configured to generate the optical current IPD that is an electrical signal that may have a higher level as the intensity of the incident light increases.

The current-voltage converter circuit 111 may be configured to convert the optical current IPD generated by the photoelectric conversion device PD into the log voltage VLOG. The current-voltage converter circuit 111 may include a first amplifier (−A1) and a feedback transistor MN1. However, embodiments of the inventive concept are not limited to the example, and the current-voltage converter circuit 111 may be implemented unlike the example shown in FIG. 5.

The optical current IPD may flow through the feedback transistor MN1 connected to the photoelectric conversion element PD. The feedback transistor MN1 may be an n-type metal oxide semiconductor (NMOS) having one terminal to which a power voltage VDD is applied.

The optical current IPD may not be in linear proportion to the intensity of the sensed light. The first amplifier −A1 may be configured to generate the log voltage VLOG by amplifying the optical current IPD into a log scale so that the log voltage VLOG is linearly proportional to the intensity of sensed light. For example, the first amplifier −A1 may be a log transimpedance amplifier. An output end of the first amplifier −A1 may be connected to a gate terminal of the feedback transistor MN1.

The first output circuit OC1 is configured to receive the log voltage VLOG and may be configured to generate the first output voltage VOUT1 in response to the selection signal SEL. The first output circuit OC1 may include a first driving transistor T11 and a first selection transistor T12.

The first driving transistor T11 may be a buffer amplifier and may be configured to buffer the signal according to the log voltage VLOG. The first driving transistor T11 is configured to amplify the log voltage VLOG and to output the amplified voltage as a first output voltage VOUT1 to the first column line. For example, a power voltage VDD may be applied to a drain terminal of the first driving transistor T11 and the log voltage VLOG may be applied to a gate terminal of the first driving transistor T11.

A drain terminal of the first election transistor T12 may be connected to a source terminal of the first driving transistor T11. In response to the selection signal SEL, the first output voltage VOUT1 may be output to the read-out circuit (e.g., 160 of FIG. 2) via the first column line. The selection signal SEL may be one of the selection signals SEL[0] to SEL[n−1] of FIG. 2.

The pixel PX may further include a source-follower buffer SF. The source-follower buffer SF may be used to reduce or prevent kick-back noise from the amplifier circuit 113 to the current-voltage converter circuit 111, and to drive a first capacitor C1 or a second capacitor C2 of the amplifier circuit 113. When the source-follower buffer SF is provided, the log voltage VLOG is input to the source-follower buffer SF, and a source-follower voltage VSF may be generated. For example, the source-follower buffer SF may include an NMOS transistor MN2 and a current source IS as an example, but the circuit configuration of the source-follower buffer SF may be variously modified in accordance with different embodiments.

The amplifier circuit 113 may be configured to generate an amplified voltage VA by amplifying the source-follower voltage VSF. The amplifier circuit 113 may include the first capacitor C1, the second capacitor C2, a second amplifier −A2, and a switch SW. The first capacitor C1 and the second capacitor C2 may be configured to charge the electric charges corresponding to the output generated by the photoelectric conversion device PD. The second amplifier −A2 may be configured to generate the output voltage VOUT by amplifying a voltage variation amount of the source-follower voltage VSF (or log voltage VLOG) during a certain time period, and a feedback circuit may be connected between an input terminal and an output terminal of the second amplifier −A2.

The first capacitor C1 may be connected to the second amplifier −A2 in series. The first capacitor C1 may be configured to charge the electric charges as the source-follower voltage VSF (or log voltage VLOG) is changed. The second amplifier −A2 may be configured to amplify the voltage generated due to the electric charges charged in the first capacitor C1 by a preset ratio. An amplification ratio of the second amplifier −A2 may be determined as a ratio between a capacitance of the first capacitor C1 and a capacitance of the second capacitor C2. The second capacitor C2 may be a feedback capacitor.

A reset switch SW may be connected between the input terminal and the output terminal of the second amplifier −A2. The reset switch SW may be turned on or off in response to the reset switching signal RS and may reset the amplification voltage VA so that the voltages at the both ends of the second amplifier −A2 are equal to each other by connecting the input terminal to the output terminal of the second amplifier −A2. In an embodiment, the reset switch SW may include a PMOS transistor, but embodiments of the inventive concept are not limited thereto. That is, the reset switch SW may be variously implemented in accordance with different embodiments.

The first capacitor C1 may be reset based on the source-follower voltage VSF in the reset operation. For example, the input terminal and the output terminal of the second amplifier −A2 are short-circuited due to the reset switch SW during the reset operation, and the source-follower voltage VSF may be applied to one end of the first capacitor C1 and the amplification voltage VA of the amplifier circuit 113 may be applied to the other end of the first capacitor C1. The first capacitor C1 may be configured to store a voltage corresponding to a difference between the electric charges at both ends. That is, when the reset switch SW is turned on in response to the reset switching signal RS, the amplifier circuit 113 may be configured to generate the amplification voltage VA by amplifying the voltage variation amount of the source-follower voltage VSF according to the change in the light intensity after the time point when the amplification voltage VA is reset.

In some embodiments of the inventive concept, the second amplifier −A2 is implemented to have a negative gain (e.g., "−A2"), the description will be provided under the assumption that the amplification voltage VA decreases when the source-follower voltage VSF increases (that is, the light intensity increases) and the amplification voltage VA increases when the source-follower voltage VSF is reduced (that is, the light intensity is reduced). However, embodiments of the inventive concept are not limited thereto, and the second amplifier −A2 may be implemented to have a positive gain.

The reset switching circuit 114 may be configured to generate the reset switching signal RS in response to the reset signal RST and the selection signal SEL. The reset signal RST may be one of the reset signals RST[0] to RST[n−1] of FIG. 2. For example, the reset switching circuit 114 may include an AND gate circuit that is configured to receive the reset signal RST and the selection signal SEL and to generate the reset switching signal RS. Therefore, the reset switching circuit 114 may be configured to generate the reset switching signal RS of logic high when receiving the reset signal RST of logic high and the selection signal SEL of logic high. That is, when it is detected that an on-event and off-event occurs in the pixel PX and the pixel PX is selected by the selection signal SEL, the amplifier circuit 113 may be reset.

In an embodiment, the reset switching signal RS may be generated as a signal having a refractory period. To prevent the switch from being unnecessarily reset, the reset switching signal RS may have a certain refractory period until the switch is opened again after resetting the reset switch SW. However, embodiments of the inventive concept are not limited thereto, and in some embodiments, the reset switching signal RS may be transferred or communicated to the reset switch SW of the amplifier circuit 113 without the refractory period described above.

The second output circuit OC2 is configured to receive the amplification voltage VA and may be configured to generate the second output voltage VOUT2 in response to the selection signal SEL. The second output circuit OC2 may include a second driving transistor T21 and a second selection transistor T22.

The second driving transistor T21 may be a buffer amplifier that may be configured to buffer the signal according to the amplification voltage VA. The second driving transistor T21 may be configured to amplify the amplification voltage VA and may output the amplified voltage as the second output voltage VOUT2 to the second column line.

A drain terminal of the second selection transistor T22 may be connected to a source terminal of the second driving transistor T21. In response to the selection signal SEL, the second output voltage VOUT2 may be output to the event detection circuit (e.g., 130 of FIG. 2) via the second output line.

Therefore, the pixel PX of the vision sensor 100 according to embodiments of the inventive concept may be configured to generate the first output voltage VOUT1 according to or based on the magnitude of the log voltage VLOG that is amplified from the optical current IPD to the log scale, the optical current IPD being generated by the photoelectric conversion device PD, and the pixel PX may be configured to generate the second output voltage VOUT2 according to or based on the variation in the magnitude of the log voltage VLOG (or the source-follower voltage VSF) that is amplified from the optical current IPD to the log scale. Therefore, the vision sensor 100 may be configured to generate both the event data VDT (see FIG. 2) including event information whether the event occurs, and the intensity image data IIDT (see FIG. 2) including intensity information about the intensity of the light.

Figure 6:
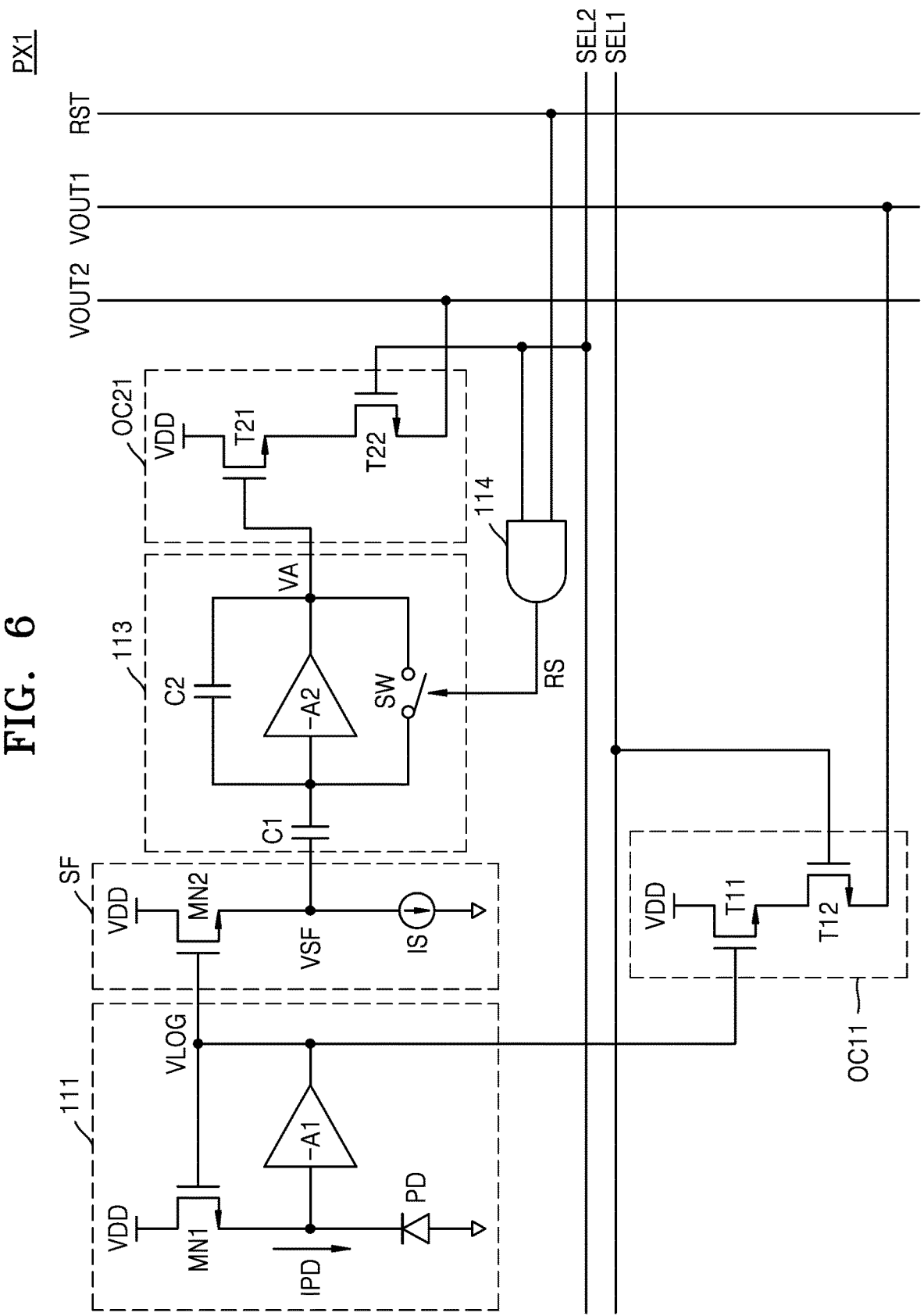
FIGS. 6 and 7 are circuit diagrams of pixels included in a pixel array according to an embodiment.
Figure 7:
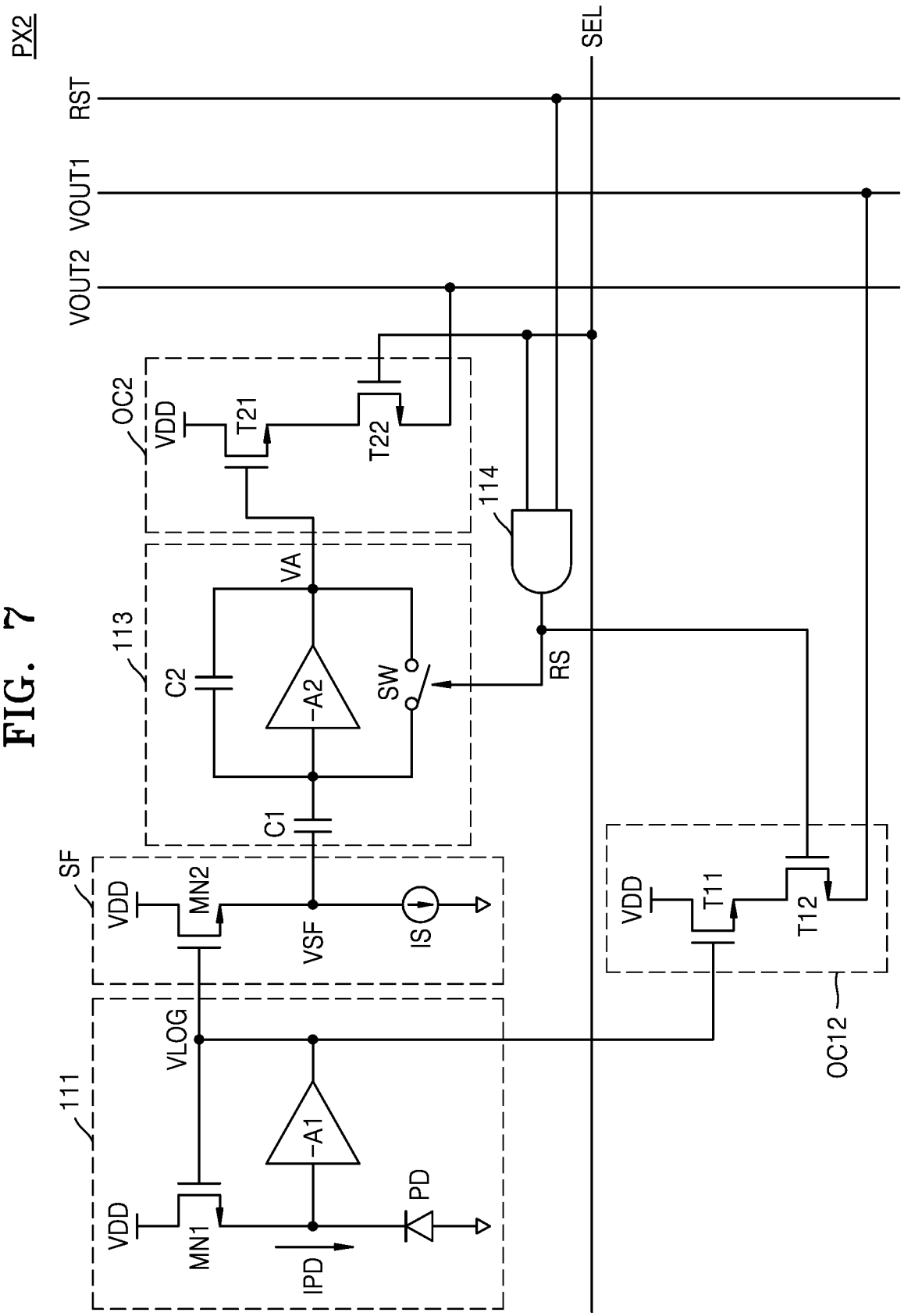

FIGS. 6 and 7 are circuit diagrams illustrating pixels PX1 and PX2 included in the pixel array 110 according to an embodiment. The pixels PX1 and PX2 may be examples of the pixel PX of FIG. 2. In the description of the embodiments of FIGS. 6 and 7, the description overlapping with that provided with reference to FIG. 5 will be omitted.

Referring to FIG. 6, the pixel PX1 may include the current-voltage converter circuit 111 including the photoelectric conversion device PD, the source-follower buffer SF, the amplifier circuit 113, the reset switching circuit 114, a first output circuit OC11, and a second output circuit OC21.

The first output circuit OC11 is configured to receive the log voltage VLOG and may be configured to generate the first output voltage VOUT1 in response to a first selection signal SEL1. The first output circuit OC11 may include a first driving transistor T11 and a first selection transistor T12. The first selection transistor T12 of the first output circuit OC11 may be configured to output the first output voltage VOUT1 to the read-out circuit (e.g., 160 of FIG. 2) via the first output line, in response to the first selection signal SEL1. The first selection signal SEL1 may be included in the selection signals SEL[0] to SEL[n−1] of FIG. 2.

The second output circuit OC21 is configured to receive the amplification voltage VA and may be configured to generate the second output voltage VOUT2 in response to the second selection signal SEL2. The second output circuit OC21 may include a second driving transistor T21 and a second selection transistor T22. In response to the second selection signal SEL2, the second selection transistor T22 of the second output circuit OC21 may be configured to output the second output voltage VOUT2 to the event detection circuit (e.g., 130 of FIG. 2) via the second output line. The second selection signal SEL2 may be included in the selection signals SEL[0] to SEL[n−1] of FIG. 2.

The pixel PX1 of the vision sensor 100 according to embodiments of the inventive concept may be configured to generate the first output voltage VOUT1 according to or based on the magnitude of the log voltage VLOG that is amplified from the optical current IPD to the log scale, the optical current IPD being generated by the photoelectric conversion device PD, and the pixel PX1 may be configured to generate the second output voltage VOUT2 according to or based on the variation in the magnitude of the log voltage VLOG (or the source-follower voltage VSF). Here, the pixel PX1 may be configured to output the first output voltage VOUT1 in response to the first selection signal SEL1, and to output the second output voltage VOUT2 in response to the second selection signal SEL2. That is, respective outputs of the first output voltage VOUT1 and the second output voltage VOUT2 may be controlled by different selection signals, that is, the first selection signal SEL1 and the second selection signal SEL2, respectively. Therefore, the vision sensor 100 may be configured to independently generate the event data VDT and the intensity image data IIDT and may transfer the event data VDT and the intensity image data IIDT to the processor (e.g., 300 of FIG. 1A or FIG. 1B) independently from each other.

Referring to FIG. 7, the pixel PX2 may include the current-voltage converter circuit 111 including the photoelectric conversion device PD, the source-follower buffer SF, the amplifier circuit 113, the reset switching circuit 114, a first output circuit OC12, and a second output circuit OC2.

The first output circuit OC12 may be configured to receive the log voltage VLOG and may be configured to generate the first output voltage VOUT1 in response to the reset switching signal RS. The first output circuit OC12 may include a first driving transistor T11 and a first selection transistor T12. The first selection transistor T12 of the first output circuit OC12 may be configured to output the first output voltage VOUT1 to the read-out circuit 160 via the first output line in response to the reset switching signal RS. Therefore, the first output circuit OC12 may be configured to output the first output voltage VOUT1 when the amplifier circuit 113 is reset.

The pixel PX2 of the vision sensor 100 according to embodiments of the inventive concept may be configured to generate the first output voltage VOUT1 according to the magnitude of the log voltage VLOG that is amplified from the optical current IPD to the log scale, the optical current IPD being generated by the photoelectric conversion device PD, and the pixel PX2 may be configured to generate the second output voltage VOUT2 according to the variation in the magnitude of the log voltage VLOG (or the source-follower voltage VSF). Here, when it is detected that an on-event or off-event occurs in the pixel PX2 and the pixel PX2 is selected by the selection signal SEL, the pixel PX2 may be configured to output the first output voltage VOUT1 simultaneously or in coordination with the reset of the amplifier circuit 113. Therefore, the vision sensor 100 may be configured to extract intensity information only from the pixels that are detected to have the event occurring therein and may be configured to generate the intensity image data IIDT by using the detected pixels and transfer the intensity image data to the processor 300.

Figure 8:
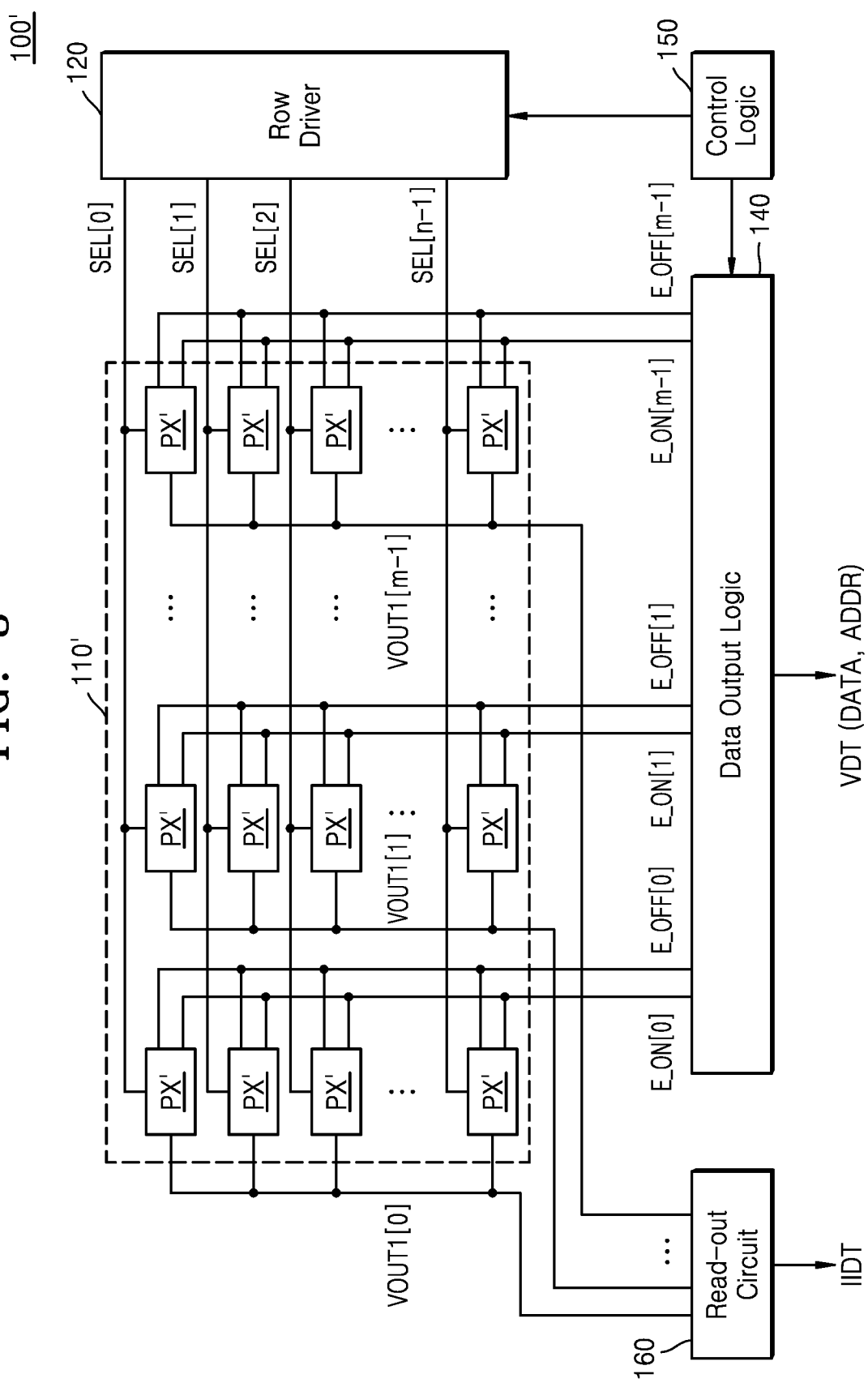
FIG. 8 is a block diagram of a vision sensor according to an embodiment.
Figure 9:
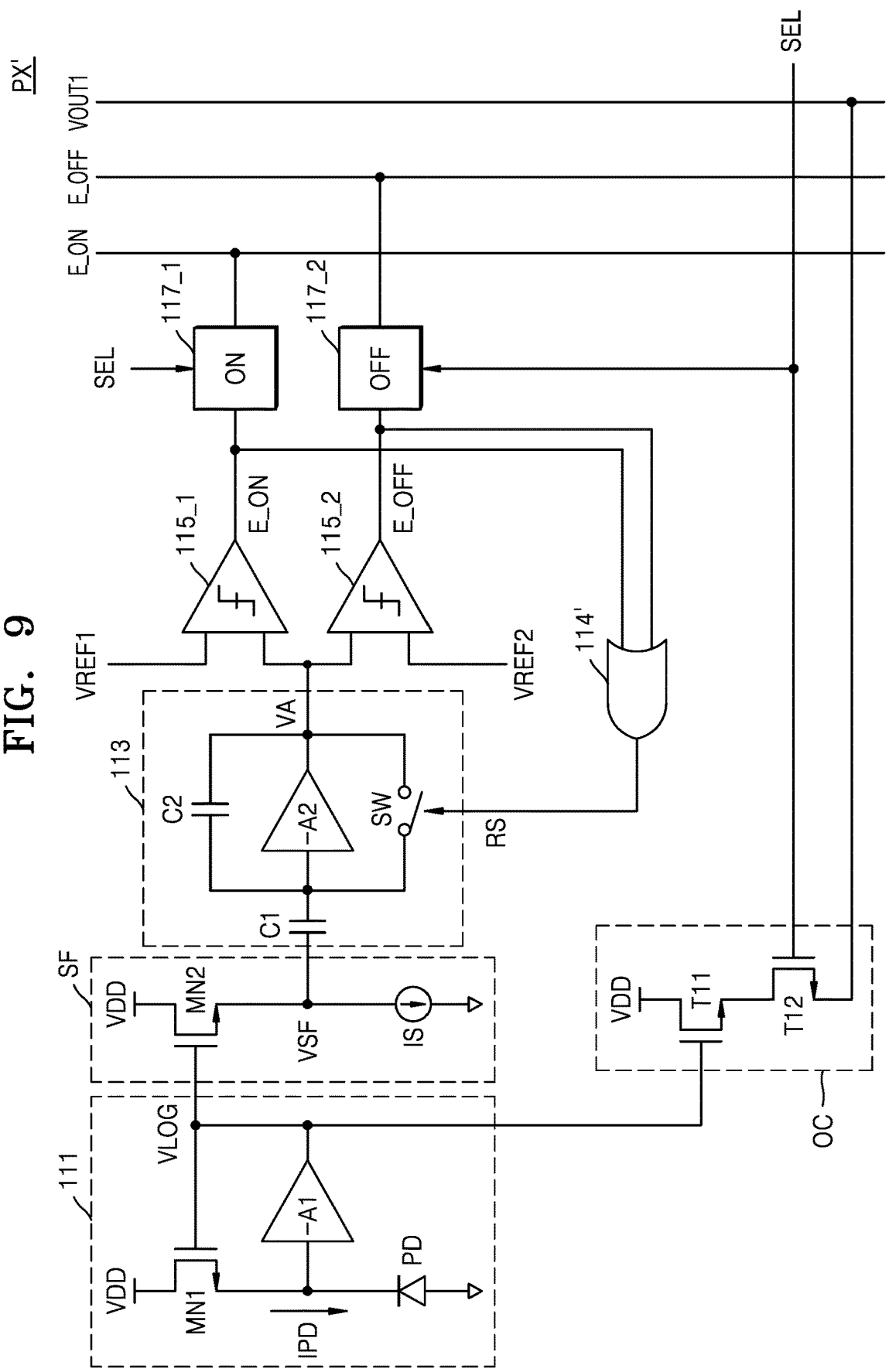
FIG. 9 is a circuit diagram of a pixel included in a pixel array according to an embodiment.

FIG. 8 is a block diagram of the vision sensor 100" according to an embodiment. FIG. 9 is a circuit diagram of the pixel PX" included in the pixel array 110" according to an embodiment. The vision sensor 100" of FIG. 8 is an example of the vision sensor 100 of FIG. 1A or FIG. 1B. In the description about FIGS. 8 and 9, the description overlapping with that provided with reference to FIGS. 2 and 5 will be omitted.

Referring to FIGS. 8 and 9, the vision sensor 100" may include a pixel array 110", the row driver 120, the data output logic 140, the control logic 150, and the read-out circuit 160. Compared with the vision sensor 100 of FIG. 2, the vision sensor 100" of FIG. 8 may have a structure corresponding to the event detection circuit 130 of FIG. 2 implemented in the pixel PX". The vision sensor 100' may further include a voltage generator that is configured to generate an on-reference voltage VREF1 and an off-reference voltage VREF2 provided to the pixel PX".

The pixel array 110" may include a plurality of pixels PX" that are arranged in a matrix form (e.g., (n)×(m) matrix, n and m are natural numbers). Each of the plurality of pixels PX' may be configured to output a first output voltage (one of VOUT1[0] to VOUT1[m−1]) via a first column line in response to a corresponding selection signal (one of SEL[0] to SEL[n−1]) received via a row line. The read-out circuit 160 may be configured to receive the first output voltages VOUT1[0] to VOUT1[m−1] and to output the intensity image data IIDT. The read-out circuit 160 may be configured to generate the intensity image data IIDT by performing analog-to-digital conversion of the first output voltages VOUT1[0] to VOUT1[m−1].

Each of the plurality of pixels PX" may be configured to sense events in which an intensity of incident light increases or decreases. Each of the plurality of pixels PX" may be configured to generate an on-signal (one of E_ON[0] to E_ON[m−1]) or an off-signal (one of E_OFF[0] to E_OFF[m−1]), may be configured to transfer or communicate the on-signal (one of E_ON[0] to E_ON[m−1]) to the data output logic 140 via the second column line, and may be configured to transfer or communicate the off-signal (one of E_OFF[0] to E_OFF[m−1]) to the data output logic 140 via the third column line.

The data output logic 140 is configured to receive the on-signals E_ON[0] to E_ON[m−1] and off-signals E_OFF[0] to E_OFF[m−1], and may be configured to generate event data VDT including event information DATA representing the polarity of occurred event and address information ADDR of the pixel PX in which the event occurs, according to or based on the on-signals E_ON[0] to E_ON[m−1] and the off-signals E_OFF[0] to E_OFF[m−1].

The pixel PX" may include the current-voltage converter circuit 111 including the photoelectric conversion device PD, the source-follower buffer SF, the amplifier circuit 113, a reset switching circuit 114', a first output circuit OC, comparison circuits 115_1 and 115_2, and holders 117_1 and 117_2. The comparison circuits 115_1 and 115_2 may correspond to the configuration of the event detection circuit 130 shown in FIG. 2.

The comparison circuits 115_1 and 115_2 may include a first comparison circuit 115_1 and a second comparison circuit 115_2. The first comparison circuit 115_1 may be configured to compare the amplification voltage VA with the on-reference voltage VREF1 and may be configured to generate the on-signal E_ON according to or based on the comparison result. The second comparison circuit 115_2 is configured to compare the amplification voltage VA with the off-reference voltage VREF2 and may be configured to generate the off-signal E_OFF according to or based on the comparison result. The first comparison circuit 115_1 and the second comparison circuit 115_2 may be configured to generate the on-signal E_ON or the off-signal E_OFF when a variation amount of the amplification voltage VA according to the change in the light incident on the photoelectric conversion device PD is equal to or greater than a certain reference or threshold. For example, the on-signal E_ON becomes high level when the intensity of light received by the photoelectric conversion device PD is increased by a certain level or greater, and the off-signal E_OFF becomes high level when the intensity of light received by the photoelectric conversion device PD is decreased by a certain level or greater.

For example, when the amplifier circuit 113 is implemented to have a negative gain (e.g., −A2), the first comparison circuit 115_1 may be configured to generate the on-signal E_ON indicating that an on-event has occurred when the amplification voltage VA is less than the on-reference voltage VREF1. Also, the second comparison circuit 115_2 may be configured to generate an off-signal E_OFF indicating that the off-event has occurred when the amplification voltage VA is greater than the off-reference voltage VREF2.

The holders 117_1 and 117_2 may include an on-event holder 117_1 and an off-event holder 117_2. Each of the on-event holder 117_1 and the off-event holder 117_2 may be configured to hold and then output the on-signal E_ON and the off-signal E_OFF, in response to the selection signal SEL.

The reset switching circuit 114' may be referred to as a self-reset signal located in the pixel PX'. When one of the on-signal E_ON or the off-signal E_OFF is generated, the reset switching circuit 114' may be configured to generate the reset switching signal RS by itself and to transfer the reset switching signal RS to the reset switch SW of the amplifier circuit 113 to reset the amplifier circuit 113.

The reset switching circuit 114' may include, for example, an OR gate. Therefore, the reset switching circuit 114' may be configured to generate the reset switching signal RS so that the reset switching circuit SW is turned on when receiving the on-signal E_ON of logic high or the off-signal E_OFF of logic high.

However, unlike the example shown in FIG. 9, the pixel PX' may not include the reset switching circuit 114' that generates the reset switching signal RS by itself. The amplifier circuit 113 of the pixel PX' may be reset according to a reset signal provided from the outside (e.g., data output logic 140) of or external to the pixel PX'.

The first output circuit OC1 is configured to receive the log voltage VLOG and may be configured to generate the first output voltage VOUT1 in response to the selection signal SEL and to transfer the first output voltage VOUT1 to the read-out circuit 160. The first output circuit OC1 may include a first driving transistor T11 and a first selection transistor T12. The first selection transistor T12 may be configured to output the first output voltage VOUT1 to the read-out circuit 160 through the first output line, in response to the selection signal SEL. The selection signal SEL may be one of the selection signals SEL[0] to SEL[n−1] of FIG. 8.

However, unlike the example shown in FIG. 9, the first output circuit OC1 may be configured to receive a selection signal independent from the selection signal SEL provided to the holders 117_1 and 117_2 and to output the first output voltage VOUT1. For example, like the first output circuit OC1 of the pixel PX1 in FIG. 6, the first output circuit OC1 may be configured to receive, from the row driver 120, a selection signal separate from the selection signal SEL provided to the holders 117_1 and 117_2 and output the first output voltage VOUT1. In other embodiments, for example, as in the first output circuit OC12 in the pixel PX2 of FIG. 7, the first output circuit OC1 may be configured to output the first output voltage VOUT1 in response to the reset switching signal RS, and thus, the first output circuit OC12 may be configured to output the first output voltage VOUT1 when the amplifier circuit 113 is reset.

Figure 10:
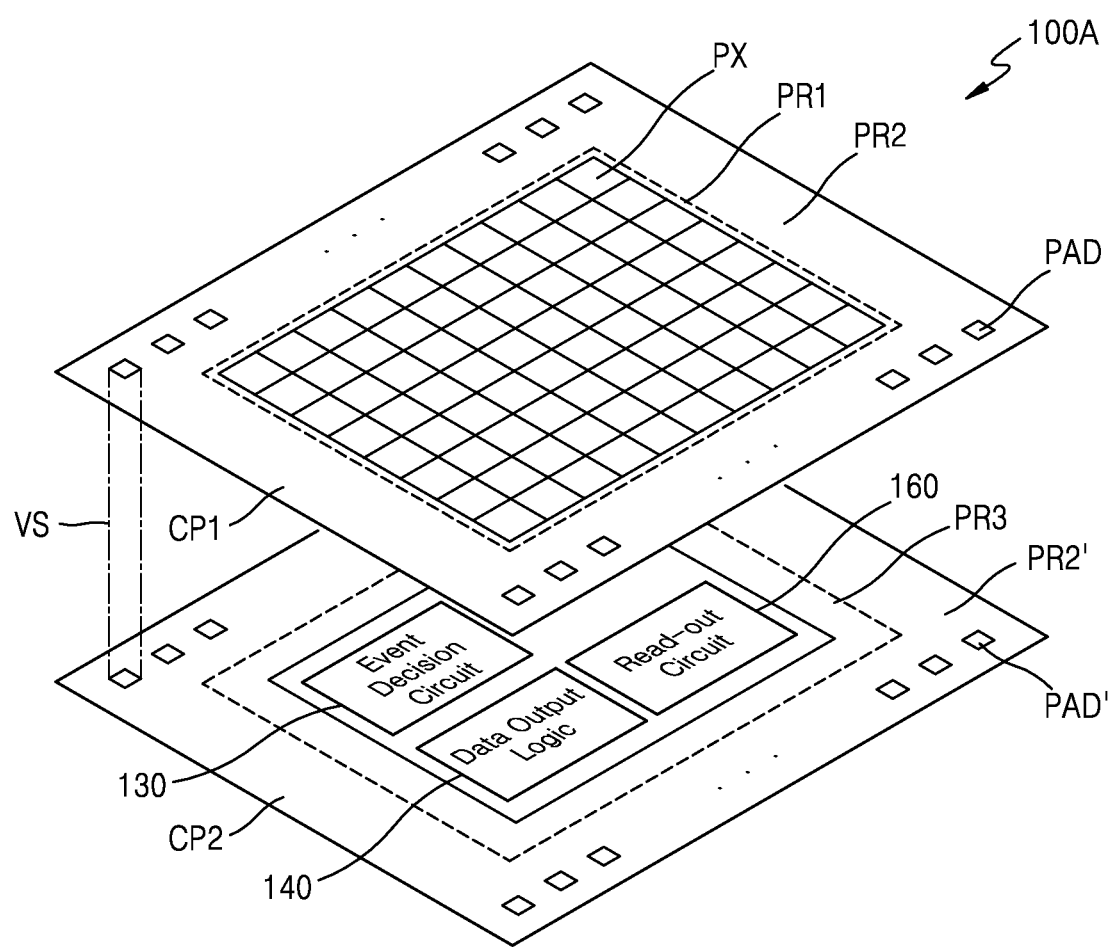
FIGS. 10 and 11 are diagrams of vision sensors according to some embodiments.
Figure 11:
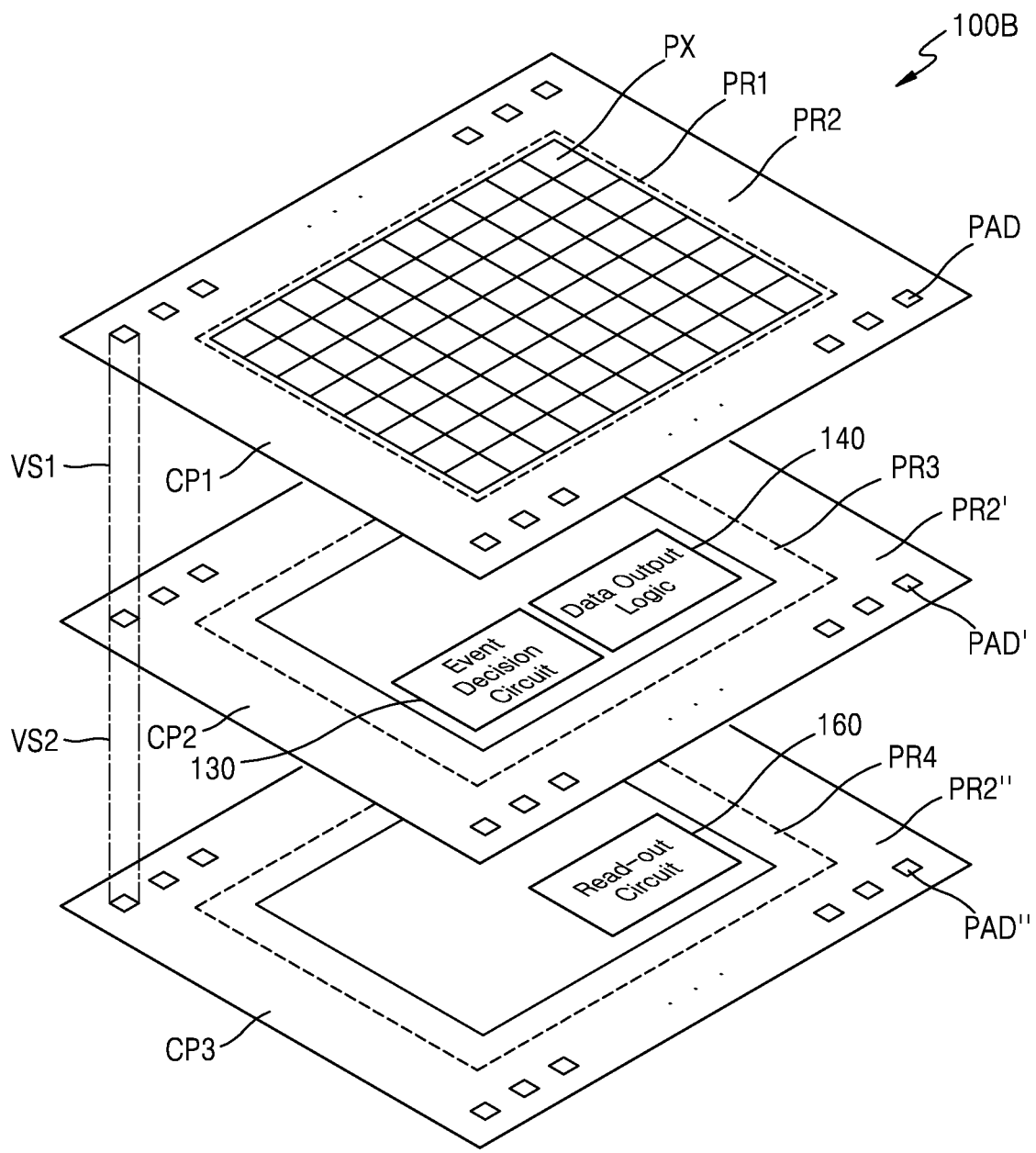

FIGS. 10 and 11 are diagrams of vision sensors 100A and 100B according to some embodiments.

Referring to FIG. 10, the vision sensor 100A may be a stack-type vision sensor including a first chip CP1 and a second chip CP2 that are stacked in a vertical direction. The vision sensor 100A may be an implementation of the vision sensor 100 or 100' described above with reference to the different embodiments of FIG. 2, FIG. 8, etc.

The first chip CP1 may include a pixel region PR1 and a pad region PR2, and the second chip CP2 may include a circuit region PR3 and a pad region PR2'. At least some of the pixels PX, PX1, PX2, and PX' described above with reference to FIGS. 5 to 7 and 9 may be formed in the pixel region PR1. In the embodiment, the current-voltage converter circuit 111 including the photoelectric conversion devices PD of the pixels PX, PX1, PX2, and PX' may be formed in the pixel region PR1 of the first chip CP1, and the other structures of the pixels PX, PX1, PX2, and PX' than the current-voltage converter circuit 111, for example, the source-follower buffer SF, the amplifier circuit 113, the first output circuits OC1, OC11, and OC12, and the second output circuits OC2, OC21, the reset switching circuit 114, the comparison circuits 115_1 and 115_2, and the holders 117_1 and 117_2 may be formed in the second chip CP2. However, embodiments of the inventive concept are not limited thereto, and the other structures of the pixels PX, PX1, PX2, and PX' than the current-voltage converter circuit 111 may be also formed in the first chip CP1.

A plurality of transistors may be formed in the circuit region PR3 of the second chip CP2. For example, in the circuit region PR3 of the second chip CP2, the row driver 120, the event decision circuit 130, the data output logic 140, the control logic 150, and the read-out circuit 160 described above with reference to FIGS. 2 and 8 may be formed. The circuits formed in the circuit region PR3 may be configured to generate the event data VDT and the intensity image data IIDT according to the log voltage VLOG generated by each of the plurality of pixels PX, PX1, PX2, and PX' formed in the pixel region PR1.

The pad region PR2 of the first chip CP2 may include a plurality of conductive pads PAD, and the pad region PR2' of the second chip CP2 may include a plurality of second conductive pads PAD'. The plurality of first conductive pads PAD may correspond to the plurality of second conductive pads PAD', and may be electrically connected to the plurality of second conductive pads PAD' by a via structure VS.

Referring to FIG. 11, the vision sensor 100B may be a stack-type image sensor including the first chip CP1, the second chip CP2, and a third chip CP3 that are stacked in the vertical direction. The vision sensor 100B may be an implementation of the image sensor 100 or 100' described above with reference to the embodiments of FIG. 2, FIG. 8, etc.

At least some of the pixels PX, PX1, PX2, and PX' described above with reference to FIGS. 5 to 7 and 9 may be formed in the pixel region PR1 of the first chip CP1. In the embodiment, the current-voltage converter circuit 111 including the photoelectric conversion devices PD of the pixels PX, PX1, PX2, and PX' may be formed in the pixel region PR1 of the first chip CP1, and the other structures of the pixels PX, PX1, PX2, and PX' than the current-voltage converter circuit 111, for example, the source-follower buffer SF, the amplifier circuit 113, the first output circuits OC1, OC11, and OC12, and the second output circuits OC2, OC21, the reset switching circuit 114, the comparison circuits 115_1 and 115_2, and the holders 117_1 and 117_2 may be formed in the second chip CP2.

The row driver 120, the event decision circuit 131, the data output logic 140, and the control logic 150 described above with reference to FIGS. 2 and 8 may be formed in the circuit region PR3 of the second chip CP2. That is, a circuit structure for generating the event data VDT according to the change in the magnitude of the log voltage VLOG generated by each of the plurality of pixels PX, PX1, PX2, and PX' formed in the pixel region PR1 may be formed in the circuit region PR3 of the second chip CP2.

The read-out circuit 160 described above with reference to FIGS. 2 and 8 may be formed in the circuit region PR4 of the third chip CP3. That is, a circuit structure for generating the intensity image data IIDT according to the change in the magnitude of the log voltage VLOG generated by each of the plurality of pixels PX, PX1, PX2, and PX' formed in the pixel region PR1 may be formed in the circuit region PR4 of the third chip CP3.

The pad region PR2 of the first chip CP2 may include a plurality of conductive pads PAD, the pad region PR2' of the second chip CP2 may include a plurality of second conductive pads PAD', and a pad region PR2" of the third chip CP3 may include a plurality of third conductive pads PAD". The plurality of first conductive pads PAD, the plurality of second conductive pads PAD', and the plurality of third conductive pads PAD" may be electrically connected to one another by a first via structure VS1 and a second via structure VS2.

Figure 12:
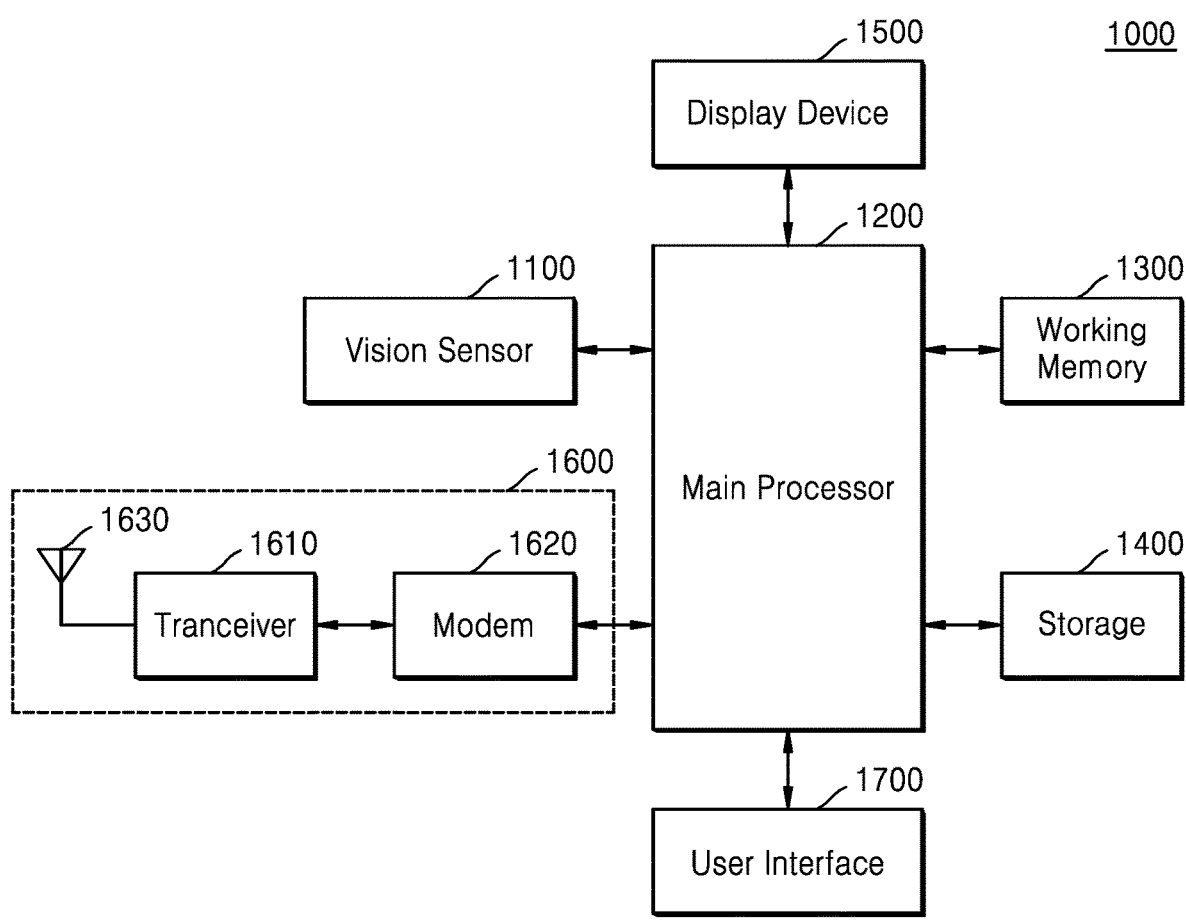
FIG. 12 is a block diagram illustrating an example of an electronic device to which a vision sensor according to an embodiment is applied.

FIG. 12 is a block diagram illustrating an example of an electronic device 1000 to which a vision sensor 1100 according to an embodiment is applied.

Referring to FIG. 12, the electronic device 1000 may include the vision sensor 1100, a main processor 1200, a working memory 1300, a storage 1400, a display device 1500, a communicator 1600, and a user interface 1700. The vision sensor 1100 may be one of the vision sensors 100, 100', 100A, and 100B described above with reference to FIGS. 1A to 11.

The vision sensor 1100 may be configured to generate event data (e.g., VDT of FIG. 1A or 1B) by sensing a movement of an object, may generate intensity image data (e.g., IIDT of FIG. 1A or 1B) according to an intensity of light reflected from the object, and may be configured to transfer or communicate the event data VDT and the intensity image data IIDT to the main processor 1200. The main processor 1200 may be configured to control overall operations of the electronic device 1000, processes the event data VDT received from the vision sensor 1100 to detect the movement of the object, and may be configured to perform the image process operation on the image data output from the image sensor. Therefore, the main processor 1200 is capable of performing an effective image process (e.g., deblurring process, etc.) on the image data, and may be configured to generate image data of high dynamic range (HDR).

The working memory 1300 may be configured to store data used in operations of the electronic device 1000.

For example, the working memory 1300 may temporarily store packets or frames processed by the processor 1200. For example, the working memory 1300 may include a volatile memory such as a dynamic RAM (DRAM), synchronous DRAM (SDRAM), etc., and/or a non-volatile memory such as a phase change RAM (PRAM), a magneto-resistive RAM (MRAM), resistive RAM (ReRAM), a ferro-electric RAM (FRAM), etc.

The storage 1400 may be configured to store data that is requested to be stored from the main processor 1200 or other components. The storage 1400 may include a non-volatile memory such as a flash memory, PRAM, MRAM, ReRAM, FRAM, etc.

The display device 1500 may include a display panel, a display drive circuit, and a display serial interface (DSI). For example, the display panel may be implemented by using various devices, such as a liquid crystal display (LCD) device, a light emitting diode (LED) display device, an organic LED (OLED) display device, an active-matrix OLED (AMOLED) display device, etc.

The display drive circuit may include a timing controller that may be used for driving the display panel, a source driver, etc. The DSI host built in the main processor 1200 may perform a serial communication with the display panel via the DSI.

The communicator 1600 may exchange signals with an external device/system via an antenna 1630. A transceiver 1610 and a modem (modulator/demodulator) 1620 of the communicator 1600 may be configured to process the signals exchanged with the external device/system according to or based on wireless communication regulations, such as long term evolution (LTE), worldwide interoperability for microwave access (WIMAX), global system for mobile communication (GSM), code division multiple access (CDMA), Bluetooth, near field communication (NFC), wireless fidelity (Wi-Fi), radio frequency identification (RFID), etc.

The user interface 1700 may include, but is not limited to, one or more a keyboard, a mouse, a keypad, a button, a touch panel, a touch screen, a touch pad, a touch ball, a gyroscope sensor, a vibration sensor, an acceleration sensor, etc.

The components of the electronic device 1000, for example, the vision sensor 1100, the main processor 1200, the working memory 1300, the storage 1400, the display device 1500, the communicator 1600, and the user interface 1700 may exchange the data based on one or more of various interface regulations, such as universal serial bus (USB), small computer system interface (SCSI), MIPI, I2C, peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), etc.

While embodiments of the inventive concept has been particularly shown and described with reference to embodiments thereof, it will be understood that various changes in form and details may be made therein without departing from the spirit and scope of the following claims.

What is claimed is:

1. A vision sensor comprising:
a pixel array including a plurality of pixels each including a photoelectric conversion device, which is configured to generate an optical current, wherein each of the plurality of pixels comprises:
 a current-voltage converter circuit including the photoelectric conversion device and configured to convert the optical current into a log voltage;
 a source-follower buffer configured to generate a source-follower voltage based on the log voltage;
 an amplifier circuit configured to generate an amplification voltage by amplifying a voltage variation of the source-follower voltage during a time period; and
 a first output circuit configured to output a first output voltage corresponding to a magnitude of the log voltage;
a read-out circuit configured to receive the first output voltage from each of the plurality of pixels and to generate intensity image data based on the first output voltage;
a data output logic configured to generate event data based on the amplification voltage; and
a first chip and a second chip stacked in a vertical direction,
wherein the first chip includes the current-voltage converter circuit of each of the plurality of pixels, and
wherein the second chip includes the source-follower buffer of each of the plurality of pixels, the amplifier circuit of each of the plurality of pixels, and the first output circuit of each of the plurality of pixels, and
wherein the second chip is disposed under the first chip in the vertical direction.

2. The vision sensor of claim 1, wherein each of the plurality of pixels is configured to output the first output voltage via a first column line, and output a second output voltage based on the amplification voltage via a second column line.

3. The vision sensor of claim 2, further comprising an event decision circuit configured to generate an on-signal or an off-signal based on a result of comparing the second output voltage with an on-reference voltage and an off-reference voltage.

4. The vision sensor of claim 3, further comprising a reset circuit configured to output to the pixel a reset signal for resetting the pixel, in response to activation of the on-signal or activation of the off-signal.

5. The vision sensor of claim 1, wherein the read-out circuit comprises:
a ramp signal generator configured to generate a ramp signal;
a comparator configured to output a comparison result signal by comparing the first output voltage with the ramp signal;
a counter configured to convert the comparison result signal into a digital signal; and
a buffer configured to output the digital signal as the intensity image data.

6. The vision sensor of claim 3, wherein each of the plurality of pixels further comprises:
a first comparison circuit configured to generate an on-signal according to a first result of comparing the amplification voltage with the on-reference voltage; and
a second comparison circuit configured to generate an off-signal according to a second result of comparing the amplification voltage with the off-reference voltage.

7. The vision sensor of claim 1, wherein the second chip includes the read-out circuit and the data output logic.

8. The vision sensor of claim 1, further comprising a third chip stacked in the vertical direction with the first chip and the second chip,
wherein the second chip includes the data output logic, the second chip being under the first chip in the vertical direction, and
wherein the third chip includes the read-out circuit, the third chip being under the second chip in the vertical direction.

9. The vision sensor of claim 1, wherein each of the plurality of pixels is configured to output the first output voltage and the second output voltage in response to a selection signal.

10. The vision sensor of claim 1, wherein each of the plurality of pixels is configured to output the first output voltage in response to a first selection signal and output the second output voltage in response to a second selection signal that is independent from the first selection signal.

11. The vision sensor of claim 1, wherein the amplifier circuit includes a reset switch configured to reset the amplifier circuit, and wherein each of the plurality of pixels further includes a reset switching circuit configured to generate a reset switching signal for switching the reset switch in response to a reset signal and a selection signal provided from an external source outside of the plurality of pixels.

12. The vision sensor of claim 11, wherein the first output circuit is configured to output the first output voltage in response to the reset switching signal.

13. An image processing device comprising:
a vision sensor configured to generate event data and intensity image data; and
a processor configured to perform image processing on the event data and the intensity image data,
wherein the event data represents a variation amount in a voltage converted from an optical current that is generated by a photoelectric conversion device included in the vision sensor,
wherein the intensity image data represents a magnitude of the voltage converted from the optical current generated by the photoelectric conversion device, and wherein the vision sensor comprises a pixel array including a plurality of pixels, each of the plurality of pixels comprising:
a current-voltage converter circuit including the photoelectric conversion device and configured to convert the optical current into a log voltage;
a source-follower buffer configured to generate a source-follower voltage based on the log voltage;
an amplifier circuit configured to generate an amplification voltage by amplifying a voltage variation of the source-follower voltage during a time period; and
a first output circuit configured to output a first output voltage corresponding to a magnitude of the log voltage,
wherein the vision sensor comprises a first chip and a second chip stacked in a vertical direction,
wherein the first chip includes the current-voltage converter circuit of each of the plurality of pixels, and
wherein the second chip includes the source-follower buffer of each of the plurality of pixels, the amplifier circuit of each of the plurality of pixels, and the first output circuit of each of the plurality of pixels, and wherein the second chip is disposed under the first chip in the vertical direction.

14. The image processing device of claim 13, wherein the vision sensor further comprises:
a read-out circuit configured to generate the intensity image data responsive to the first output voltage output from each of the plurality of pixels, respectively;
an event decision circuit configured to receive a second output voltage output from each of the plurality of pixels, and generate on-signals and off-signals based on results of comparing the second output voltages with an on-reference voltage and an off-reference voltage, respectively; and
a data output logic configured to generate the event data based on the on-signals and the off-signals.

15. The image processing device of claim 13, further comprising an image sensor configured to generate image data,
wherein the processor is configured to perform image processing on the image data by using the event data and the intensity image data.

16. The image processing device of claim 14, wherein the event decision circuit comprises:
a first comparison circuit configured to generate the on-signal based on a result of comparing the second output voltage with the on-reference voltage; and
a second comparison circuit configured to generate the off-signal based on a result of comparing the second output voltage with the off-reference voltage.

17. The image processing device of claim 14, wherein the second chip includes the read-out circuit, the event decision circuit, and the data output logic.

18. The image processing device of claim 14, wherein the vision sensor further includes a third chip stacked in the vertical direction with the first chip and the second chip,
wherein the second chip includes the data output logic and the event decision circuit, the second chip is disposed under the first chip in the vertical direction, and
wherein the third chip includes the read-out circuit, the third chip is disposed under the second chip in the vertical direction.

19. The image processing device of claim 13, wherein each of the plurality of pixels further comprises:

a first comparison circuit configured to generate an on-signal according to a first result of comparing the amplification voltage with the on-reference voltage; and a second comparison circuit configured to generate an off-signal according to a second result of comparing the amplification voltage with the off-reference voltage.

* * * * *